United States Patent
Presti et al.

(10) Patent No.: US 9,541,974 B1
(45) Date of Patent: Jan. 10, 2017

(54) VOLTAGE TRANSITION TECHNIQUE FOR A VOLTAGE CONVERTER

(71) Applicant: Maxim Integrated Products, Inc., San Jose, CA (US)

(72) Inventors: Armando Presti, Acireale (IT); Vincent Trimeloni, Cupertino, CA (US); Antonio Magazzu, Messina (IT)

(73) Assignee: Maxim Integrated Products, Inc., San Jose, CA (US)

(*) Notice: Subject to any disclaimer, the term of this patent is extended or adjusted under 35 U.S.C. 154(b) by 562 days.

(21) Appl. No.: 13/925,712

(22) Filed: Jun. 24, 2013

Related U.S. Application Data

(60) Provisional application No. 61/792,990, filed on Mar. 15, 2013.

(51) Int. Cl.
| | |
|---|---|
| *H02M 1/00* | (2006.01) |
| *G06F 1/26* | (2006.01) |
| *H02M 3/157* | (2006.01) |
| *H02M 3/156* | (2006.01) |

(52) U.S. Cl.
CPC ............... *G06F 1/26* (2013.01); *H02M 3/157* (2013.01); *H02M 2001/0025* (2013.01); *H02M 2003/1566* (2013.01)

(58) Field of Classification Search
CPC ............ G05F 1/56; G05F 1/462; G05F 1/575; G05F 1/562; G05F 1/46; G05F 1/10; G05F 1/468; H02M 2001/0025; H02M 2001/0029; H02M 3/157; H02M 2003/1566; G06F 1/26
See application file for complete search history.

(56) References Cited

U.S. PATENT DOCUMENTS

| | | | | |
|---|---|---|---|---|
| 2012/0249094 A1* | 10/2012 | Zhao | ...................... | H02M 3/00 323/234 |
| 2013/0049720 A1* | 2/2013 | Nien | ................... | H02M 3/1588 323/271 |
| 2013/0162226 A1* | 6/2013 | Su | ......................... | H02M 3/156 323/234 |
| 2013/0342181 A1* | 12/2013 | Suppanz | ............. | H02M 3/1582 323/271 |
| 2014/0043008 A1* | 2/2014 | Babazadeh | ............... | G05F 3/02 323/304 |
| 2014/0084887 A1* | 3/2014 | Sahu | ...................... | H02M 3/158 323/283 |
| 2014/0139198 A1* | 5/2014 | Manlove | ................... | G05F 1/10 323/282 |

* cited by examiner

*Primary Examiner* — Gustavo Rosario Benitez
(74) *Attorney, Agent, or Firm* — North Weber & Baugh LLP

(57) ABSTRACT

The present invention relates to a voltage converter based on a switching regulator, and more particularly, to systems, devices and methods of dynamically controlling an output of the voltage converter to rapidly transition between different power supply voltages as required in many electronic devices. The switching regulator generates an output supply voltage that tracks a voltage originally provided by an internal DAC. During the supply voltage variation, a step control signal is provided to introduce a supplemental voltage step into the reference voltage before the reference voltage is used to generate the output supply voltage. The switching regulator is thereby overdriven under this supplemental voltage step, enhancing the slew rate and the settling time of the output supply voltage to meet stringent requirements imposed by many electronic devices.

19 Claims, 10 Drawing Sheets

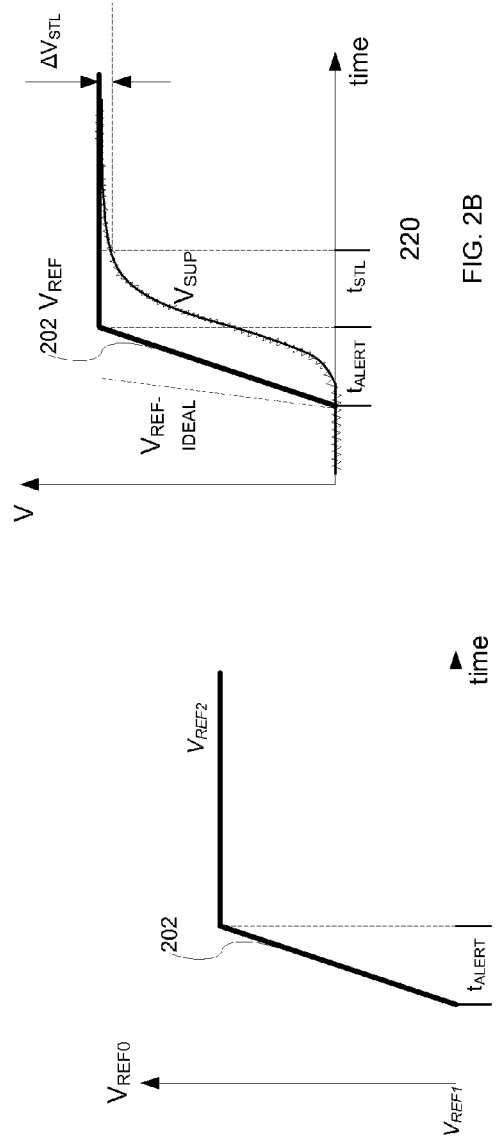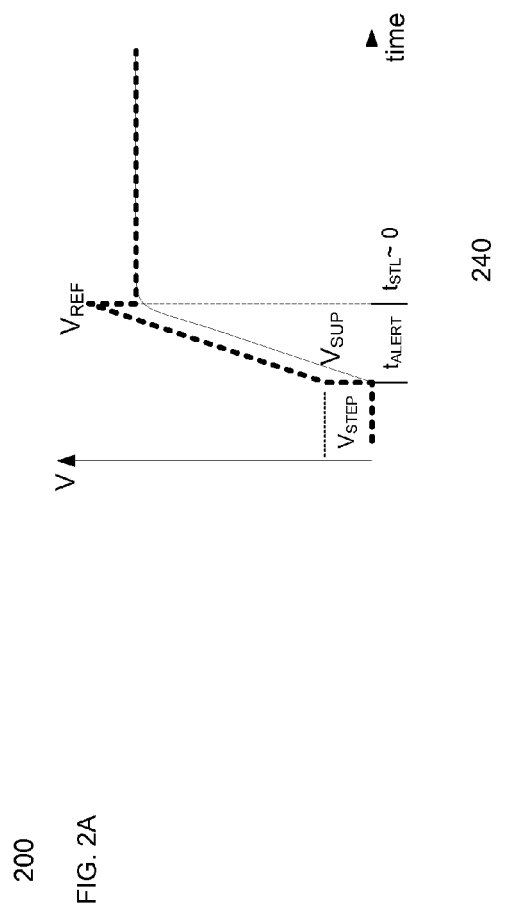
FIG. 2A
FIG. 2B
FIG. 2C

280

110

404

800

VOLTAGE TRANSITION TECHNIQUE FOR A VOLTAGE CONVERTER

CROSS REFERENCE TO RELATED APPLICATION

The application claims the benefit under 35 U.S.C. §119 (e) of Provisional Application Ser. No. 61/792,990, entitled "A Voltage Transition Technique for a Voltage Converter," filed on Mar. 15, 2013, the subject matter of which is incorporated herein by reference in its entirety.

BACKGROUND

A. Technical Field

The present invention relates to a voltage converter, and more particularly, to systems, devices and methods of dynamically controlling an output of the voltage converter to rapidly transition between different power supply voltages as required in many electronic devices.

B. Background of the Invention

In most state-of-the-art electronic devices, processors are normally driven by variable power supply voltages. A voltage regulator module is oftentimes integrated to convert a high power supply voltage of +5V, +12V or more to a much lower voltage, such as +1.5V, required by many processors. Although it is fixed in some processors, this lower voltage supply is normally adjustable according to the activity level of the processors, such that power consumption may be better conserved when the activity level is low at an idle or pseudo-idle state. This is particularly important when more and more electronic devices are becoming mobile and relying on batteries to provide power to their regular operation.

The most demanding variable power supply specifications are found in central processing units (CPU) applied in a notebook, a desktop computer or a computer server. The voltage regulator module is coupled to receive voltage identification (VID) from the CPU, and thereby, continuously adjusts the power supply voltage as requested by the CPU. For instance, an eight-bit VID may be applied to the voltage regulator module for outputting a supply voltage between 0.5V and 2.5V. As the VID varies, the supply voltage has to rapidly transition to a higher or lower voltage level within the predetermined voltage range based on the new VID. For Intel microprocessors, such transitions are normally called as VID transitions, while other devices may generally refer to them as "dynamic supply voltage transition" or "supply voltage scaling."

A switching regulator is normally applied to convert an input supply voltage of +5V, +12V or more to the target supply voltage according to a reference voltage. The switching regulator mainly relies on a switching controller to control internal switching activities of a buck or boost converter core. When the switching regulator alternates between two control states, an inductor in the converter core temporarily store power in one control state and release it in a subsequent control state, and therefore, the output supply voltage is continuously maintained by the power that is either directly provided by the input supply voltage or previously stored in the inductor. The duty cycles of these two control states are determined according to the reference voltage and the input supply voltage, and particularly, are controlled in a closed loop by the switching controller based on the specific architecture of the switching regulator. During supply voltage scaling, the duty cycles are varied to enable the supply voltage transition to a distinct voltage level.

In prior art, supply voltage scaling is oftentimes associated with a slow slew rate, a long transition time and a long settling time. The switching regulator relies on a digital-to-analog converter (DAC) to provide the reference voltage. The reference voltage is determined according to the VID which is normally communicated via a serial interface between the processors and the voltage regulator module. Although data communication and conversion via the serial interface takes a negligible period of time, the switching regulator may nevertheless be associated with such a narrow bandwidth that the transition and settling times are fundamentally limited in supply voltage scaling.

The natural bandwidth of the switching regulator may not be sufficiently wide particularly because of the use of a large LC filter and the presence of load-line impedance. As a result, the transition and settling times may fail to track the reference voltage closely or meet the timing requirements in certain applications. A need exists to dynamically control the output of the switching regulator to rapidly transition between different power supply voltages as required in many electronic devices, and particularly in many high-end electronic devices.

SUMMARY OF THE INVENTION

Various embodiments of the invention relate to a voltage converter, and more particularly, to systems, devices and methods of dynamically controlling an output of the voltage converter to rapidly transition between different power supply voltages as required in many electronic devices. During a supply voltage variation, a step control signal is provided to introduce a supplemental voltage step into a reference voltage. When an output supply voltage is controlled to track the reference voltage, the voltage converter is overdriven by this supplemental voltage step, enhancing the slew rate and the settling time of the output supply voltage.

In accordance with one embodiment of the invention, a voltage converter that drives a load comprises a reference controller, an internal digital-to-analog converter (DAC) and a switching regulator. The reference controller is coupled to receive a transition control associated with a target supply voltage needed to drive the load, and generates a DAC control signal and a step control signal. The internal DAC is controlled by the DAC control signal to generate a reference voltage that varies from a first voltage to a second voltage within a supply voltage transition. The switching regulator generates an output supply voltage that substantially tracks the reference voltage at a slew rate. During the course of the supply voltage transition, a supplemental voltage step is introduced to the reference voltage under the step control signal, and later deducted from the reference voltage once the load is driven by the target supply voltage. In some embodiments, the voltage converter further comprises a compensation circuit that compensates an offset of the reference voltage that is caused by a voltage drop associated with a local ground of the load.

In various embodiments of the present invention, the supplemental voltage step may be introduced in the compensation circuit, the internal DAC, the switching regulator or via a discrete current source.

In accordance with another embodiment of the invention, a method is applied to vary a supply voltage that drives a load to a target supply voltage. The supply voltage is initially generated to be substantially equal to a first voltage. After a command is received to vary the supply voltage to a second voltage, a supplemental voltage step is introduced into a reference voltage that is used as a reference to generate the supply voltage. The first and second voltage are associated with the target supply voltage set forth to drive the load prior to and subsequent to a supply voltage transition. The reference voltage is thereafter varied by a voltage magnitude that is equal to the difference between the first and second voltages, and the supply voltage is controlled to follow the corresponding variation of the reference voltage at a slew rate. When the supply voltage reaches the second voltage, the supplemental voltage step is deducted from the reference voltage. As a result, both the reference voltage and the supply voltage settle at the second voltage.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 2A illustrates an exemplary diagram for a reference voltage transition according to various embodiments of the invention.

FIG. 2B illustrates an exemplary time diagram of an output supply voltage $V_{SUP}$ that needs to meet certain transition requirements according to various embodiments of the invention.

FIG. 2C illustrates an exemplary time diagram of a reference voltage $V_{REF}$ that incorporates a supplemental voltage step $V_{STEP}$ according to various embodiments of the invention.

DETAILED DESCRIPTION OF THE PREFERRED EMBODIMENTS

Figure 1A:
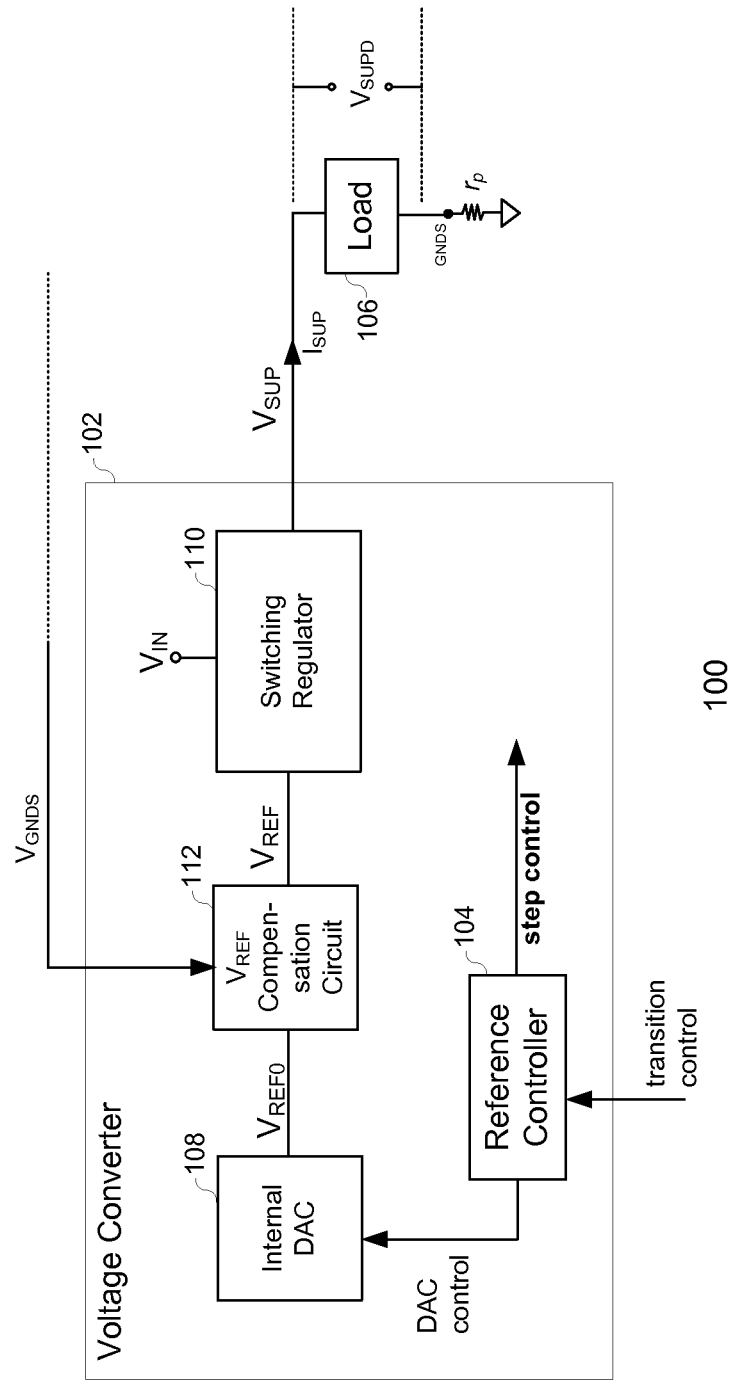
FIG. 1A illustrates an exemplary block diagram of an electronic device that relies on a voltage converter to drive a load according to various embodiments in the invention.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to a voltage converter based on a switching regulator, and more particularly, to systems, devices and methods of dynamically controlling an output of the voltage converter to rapidly transition between different power supply voltages as required in many electronic devices. Upon receiving a request to switch to a different supply voltage level, a step control is provided to introduce a supplemental voltage step $V_{STEP}$ to a reference voltage $V_{REF}$. The reference voltage $V_{REF}$ is normally used as a reference, and the output supply voltage $V_{SUP}$ is controlled to track the reference voltage $V_{REF}$. When the supply voltage $V_{SUP}$ needs to switch to a different supply voltage level, this reference voltage $V_{REF}$ is varied, and the supply voltage $V_{SUP}$ is expected to follow the reference voltage $V_{REF}$ according to a certain slew rate.

In accordance with the invention, the supplemental voltage step $V_{STEP}$ is applied on the variation of the reference voltage during a supply voltage transition. The supplemental voltage step $V_{STEP}$ acts as an excessive reference voltage that overdrives the switching regulator, such that the output supply voltage $V_{SUP}$ may be varied to satisfy the timing requirements. As a result, this excessive reference voltage effectively compensates narrow bandwidths and unsatisfactory transition and settling times that are caused by the inherent parasitics and load-line impedance.

FIG. 1A illustrates an exemplary block diagram 100 of an electronic device that relies on a voltage converter to drive a load according to various embodiments in the invention. The voltage converter 102 receives a transition control signal that defines a target supply voltage $V_{SUPD}$, and generates an output supply voltage $V_{SUP}$ to drive a load 106. This voltage converter 102 further comprises a reference controller 104, an internal DAC 108, a switching regulator 110 and a $V_{REF}$ compensation circuit 112. The reference controller 104 generates a DAC control and a step control from the transition control signal. The internal DAC 108 converts the DAC control to a basic reference voltage $V_{REF0}$ that is further compensated in the compensation circuit 112. The switching regulator 110 uses the compensated reference voltage $V_{REF}$ as a reference, and generates the output supply voltage $V_{SUP}$ that substantially tracks the reference voltage $V_{REF}$.

The load 106 is preferably driven by the target supply voltage $V_{SUPD}$ set by the reference control, but it is actually biased under a differential supply voltage which is associated with the output supply voltage $V_{SUP}$ deducted by an offset voltage. The offset voltage results from the parasitics and impedance $r_p$ associated to a path that connects a local load ground GNDS to a common ground. The $V_{REF}$ compensation circuit 112 is coupled between the internal DAC 108 and the switching regulator 110 to compensate the offset voltage to the basic reference voltage $V_{REF0}$, such that the compensated reference voltage $V_{REF}$ may be provided to drive the load 106 at the target supply voltage $V_{SUPD}$.

The DAC control is associated with the target supply voltage $V_{SUPD}$ and used to set the basic reference voltage $V_{REF0}$ according to the target supply voltage $V_{SUPD}$. When the supply voltage $V_{SUPD}$ is required to transition from a first supply voltage to a second supply voltage, the DAC control is used to control the internal DAC 108 and enable a corresponding variation in the reference voltages $V_{REF0}$. The supply voltage $V_{SUPD}$ may therefore be controlled to follow the variation of the reference voltage $V_{REF0}$. In various embodiments of the invention, the second supply voltage may be higher or lower than the first supply voltage, and the corresponding voltage variation may range from a few millivolts up to a few volts.

In accordance with the invention, the reference controller 104 further generates a step control signal to introduce a supplemental voltage step $V_{STEP}$, when the supply voltage $V_{SUPD}$ transitions between the first and second supply voltages. The supplemental voltage step $V_{STEP}$ is combined with the voltage variation of the reference voltage $V_{REF}$, before the reference voltage $V_{REF}$ is applied to control switching activities within the switching regulator 110. One of the internal DAC 108, the compensation circuit 112 and the switching regulator 110 may be coupled to receive the step control signal, and adjust the reference voltage $V_{REF}$, before the reference voltage $V_{REF}$ is used to generate the supply voltage $V_{SUPD}$.

In some embodiments, the transition control is a multi-bit digital signal provided to define the target supply voltage $V_{SUPD}$. The reference controller 104 generates the DAC control and the step control from the multi-bit digital signal, particularly for generating the basic reference voltage $V_{REF0}$ and the supplemental voltage step $V_{STEP}$, respectively.

Figure 1B:
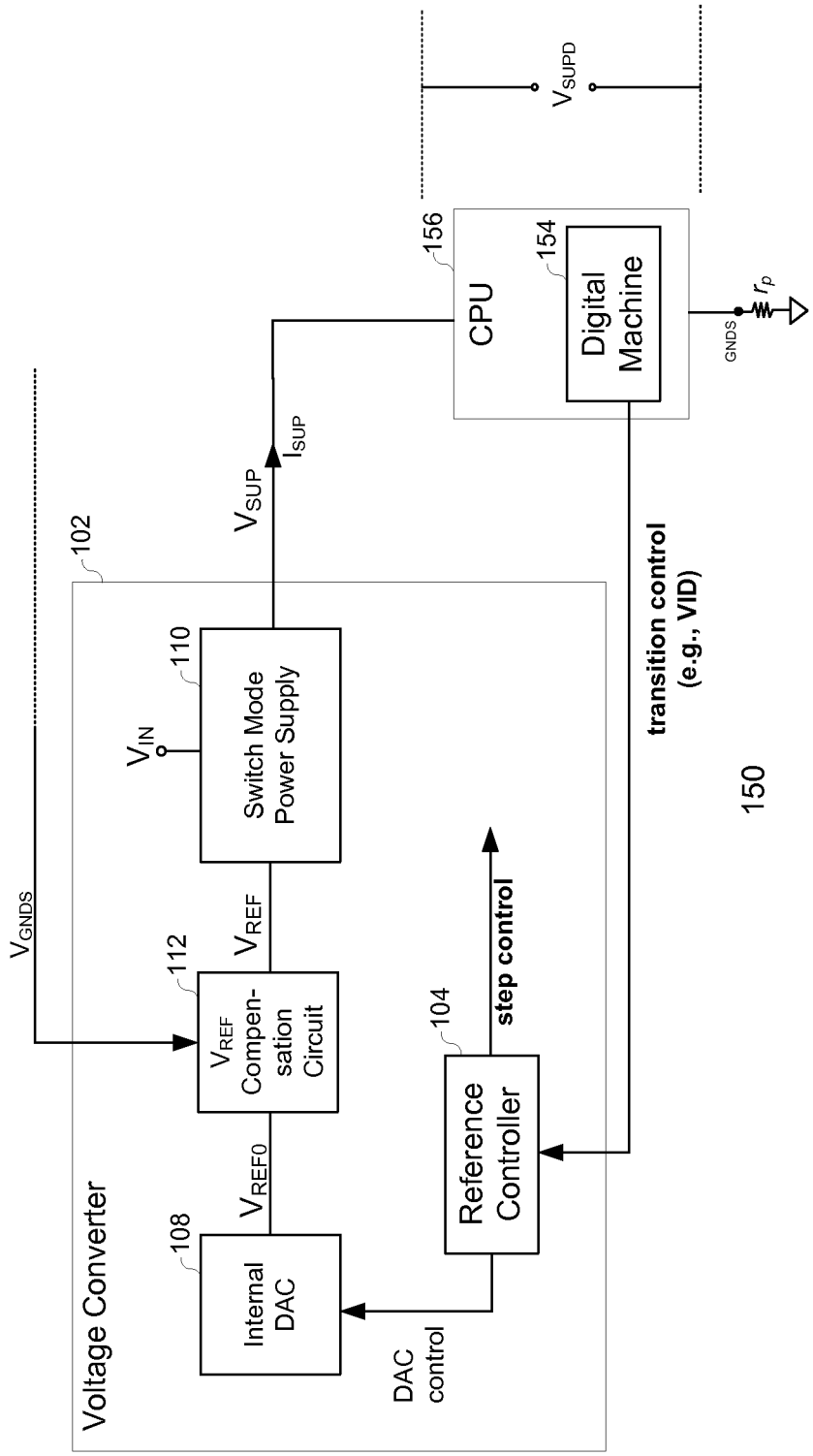
FIG. 1B illustrates an exemplary block diagram of an electronic device that relies on a voltage converter to drive a CPU according to various embodiments in the invention.

FIG. 1B illustrates an exemplary block diagram of an electronic device 150 that relies on a voltage converter to drive a CPU according to various embodiments in the invention. The electronic device 150 is normally a personal computer that incorporates the CPU 156, and the voltage converter 102 is integrated in a processor power module (PPM) to provide the target supply voltage $V_{SUPD}$ required by the CPU 156. A digital machine 154 in the CPU provides a transition control signal to the voltage converter 102. The CPU 156 issues a request for a supply voltage transition via the transition control signal, and identifies the specifications of the target supply voltage $V_{SUPD}$ in the transition control signal as well.

The transition control signal is associated with a number of bits called voltage identification (VID). The CPU 156 communicates to the voltage converter 102 the transition control including the VID via a digital interface using proprietary protocol. In certain embodiments, the digital interface is implemented using a serial data interface that allows bi-directional data and control exchange.

In addition to the VID, some control data included in the transition control signal are also communicated from the CPU 156 to the voltage converter 102 via the digital interface. These control data are used to determine converter parameters, such as a target slew rate of a supply voltage transition, the number of active phases in the switching regulator 110 and other power management data and control. In some embodiments, the digital interface may also be used to collect power and current consumption data from the voltage converter 102.

Once the transition control is received by the voltage converter 102, the reference controller recovers a DAC control and a step control based on the VID and a transition control in the reference control, respectively. The DAC control is used by the internal DAC 108 to generate a basic reference voltage $V_{REF0}$ that is directly associated with the target supply voltage $V_{SUPD}$, while the transition control data is converted to a step control that enables a supplemental voltage step $V_{STEP}$ according to the target slew rate required by the CPU 156.

The bit number of the VID used to define the supply voltage $V_{SUPD}$ determines the corresponding accuracy of the reference voltage $V_{REF0}$. For instance, an 8-bit VID is associated with 256 supply voltage levels, and may result in a resolution of 10 mV when the reference voltage $V_{REF0}$ has to be generated between 0.5V and 2.55V.

The output supply voltage $V_{SUP}$ is associated with two figures of merit, including a transition time and a settling time. The transition time is used to represent the target transition time between a first supply voltage for the initial supply voltage and a second supply voltage for the target supply voltage. Given specifications about the target slew rate SR, the transition time is inversely proportional to the slew rate between these two supply voltages. The reference voltage $V_{REF0}$ may be controlled to transition between two reference voltages that are associated with the first and second supply voltages substantially at this target slew rate SR. This is particularly true because the internal DAC 108 responds to the transition control signal promptly with a negligible delay.

FIG. 2A illustrates an exemplary diagram 200 for a reference voltage transition according to various embodiments of the invention. The transition time is practically defined as the time for the internal DAC 108 to transition between two reference voltages $V_{REF1}$ and $V_{REF2}$, when the reference voltage transition is controlled to be completed at the target slew rate SR. Once the transition is completed, the internal DAC 108 normally returns a flag or an alert signal, and the time used is recognized as the transition time. Therefore, this transition time is also called an alert time $T_{ALERT}$, because it depends on reception of the alert signal. In one exemplary converter, the transition time $T_{ALERT}$ is 31 microseconds for a supply voltage transition of 0V to 1.8V, and is associated with an average slew rate SR of 58 mV/μs.

Based on the prompt response of the internal DAC 108, the reference voltage transition as in Curve 202 substantially represents a desired supply voltage transition. However, the supply voltage $V_{SUPD}$ is associated with much more degraded delay, transition and settling performances because of the limited bandwidth of the switching regulator 110. Measured according to the supply voltage $V_{SUPD}$, the settling time $T_{STL}$ normally lasts much longer and requires more flexible requirements, although the requirements for $T_{ALERT}$ may be easily met.

FIG. 2B illustrates an exemplary time diagram 220 of an output supply voltage $V_{SUPD}$ that needs to meet certain transition requirements according to various embodiments of the invention. Curve 202 is associated with a target slew rate SR and a target transition time $T_{ALERT}$ that are required during a supply voltage transition from a first supply voltage to a second supply voltage. The reference voltage $V_{REF0}$ may be outputted by the internal DAC 108 to substantially follow curve 202. The settling time $T_{STL}$ is the time taken to settle substantially close to the second supply voltage after the alarm signal is returned. In various embodiments of the invention, a settling threshold $\Delta V_{STL}$ is defined, and the supply voltage $V_{SUPD}$ substantially reaches the second supply voltage when it transitions to a range of $\pm\Delta V_{STL}$ around the second supply voltage.

For instance, for a certain voltage converter 102 used to drive a CPU 106, the output supply voltage $V_{SUPD}$ may have to settle to less than 10 mV around the second supply voltage within 5 microseconds after the alert signal is issued. Such a settling time $T_{STL}$ may be consistently imposed for both large and small voltage transitions. In one embodiment, a settling time $T_{STL}$ of 5 microseconds is required for both transitions of 5 mV and 1V.

However, the settling time of the supply voltage $V_{SUP}$ is associated with a slew rate that considerably worse than the target slew rate. This is particularly because the voltage converter 102 could have a narrow bandwidth either resulting from parasitics associated with the converter 110 or resulting from the load-line impedance. In certain embodiments, the profile of the reference voltage $V_{REF0}$ may be adjusted to improve the settling time $T_{STL}$ and thus the slew rate SR for the supply voltage $V_{SUPD}$. In particular, to make the supply voltage $V_{SUP}$ to follow curve 202, another reference voltage $V_{RFE-IDEAL}$ has to be applied to drive the switching regulator 110. This reference voltage $V_{RFE-IDEAL}$ transitions between the first and second supply voltages with a faster slew rate, and as a result, the supply voltage $V_{SUP}$ may be boosted up to follow curve 202.

In some embodiments, certain stringent requirements are imposed on the supply voltage $V_{SUP}$ concerning the slew rate SR, the transition time $T_{ALERT}$ and the settling time $T_{STL}$. The requirements may not be met even when the reference voltage $V_{REF-IDEAL}$ adopts a step variation between the first and second supply voltages.

FIG. 2C illustrates an exemplary time diagram 240 of a reference voltage $V_{REF}$ that incorporates a supplemental voltage step $V_{STEP}$ according to various embodiments of the invention. For convenience of illustration, reference voltage compensation for ground shift of the load 106 is negligible in FIG. 2C. A slew rate SR, a transition time $T_{ALERT}$ and a settling time $T_{STL}$ are required during a supply voltage transition. The reference voltage $V_{REF}$ that is used by the switching regulator 110 not only varies from the first supply voltage to the second supply voltage according to the requirements, but also further incorporates the supplemental voltage step $V_{STEP}$ during the supply voltage transition. In some embodiments, when the second supply voltage is higher than the first supply voltage, the reference voltage $V_{REF}$ is further increased by the supplemental voltage step $V_{STEP}$. In other embodiments, when the second supply voltage is lower than the first supply voltage, the reference voltage $V_{REF}$ is further reduced by the supplemental voltage step $V_{STEP}$.

The supplemental voltage step $V_{STEP}$ is generally introduced to overdrive the switching regulator 110, enabling the supply voltage $V_{SUPD}$ to track curve 202 during the supply voltage transition. The settling time $T_{STL}$ is substantially reduced to zero, when the switching regulator 110 endeavors to generate the output supply voltage $V_{SUP}$ that catch up with the reference voltage $V_{REF}$. When a supplemental voltage step $V_{STEP}$ of a proper size is adopted to adjust the reference voltage $V_{REF0}$ provided by the DAC 108, it is possible to enable the supply voltage $V_{SUPD}$ to vary via a preferred transition that meets the requirement for the slew rate SR and has a substantially zero settling time $T_{STL}$.

Figure 2D:
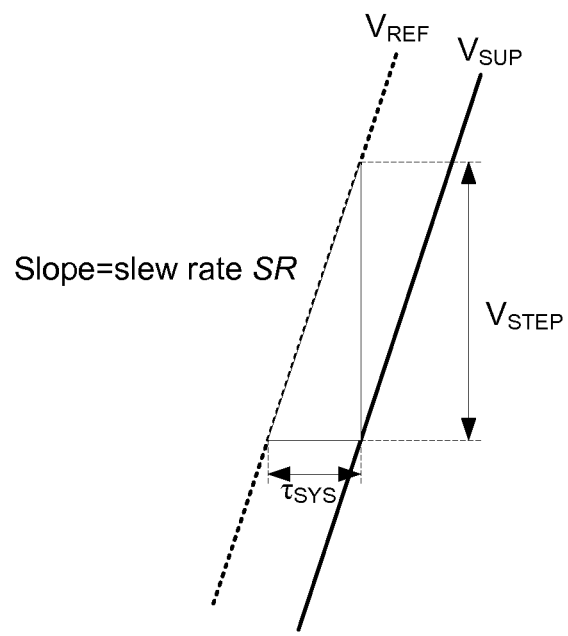
FIG. 2D illustrates an exemplary method of calculating a supplemental voltage step $V_{STEP}$ according to various embodiments of the invention.

FIG. 2D illustrates an exemplary method 280 of calculating a supplemental voltage step $V_{STEP}$ according to various embodiments of the invention. The slew rate SR is associated with a slope for the transition of the reference voltage $V_{REF}$, and such a slope is equal to a ratio between the supplemental voltage step $V_{STEP}$ and a time constant $\tau_{SYS}$ of the entire system. The time constant $\tau_{SYS}$ is associated with various parasitic sources in the system, and may be represented as:

$$\tau_{SYS} = 2\lambda f_{\tau} \qquad (1)$$

wherein $f_{\tau}$ is the unity gain frequency of the open loop transfer function of the voltage converter 102. As a result, the supplemental voltage step $V_{STEP}$ may be calculated as follows:

$$V_{STEP} = SR \times \tau_{SYS} = SR/(2\pi f_{\tau}) \qquad (2)$$

As an example, a supplemental voltage step $V_{STEP}$ of 127 mV is needed to enable a voltage converter 102 that has a unity gain frequency of 50 kHz to transition at a slew rate of 40 mV/μsec.

In many electronic devices, a supply voltage transition is associated with a finite number of slew rate requirements, and therefore, the supplemental voltage step $V_{STEP}$ has a finite number of potential values. In one embodiment, the requirement of the slew rate SR is received via the reference control, and during the supply voltage transition, the reference controller 104 may separate the step control and apply it to directly select the supplemental voltage step $V_{STEP}$ from the finite number of potential values.

Figure 3:
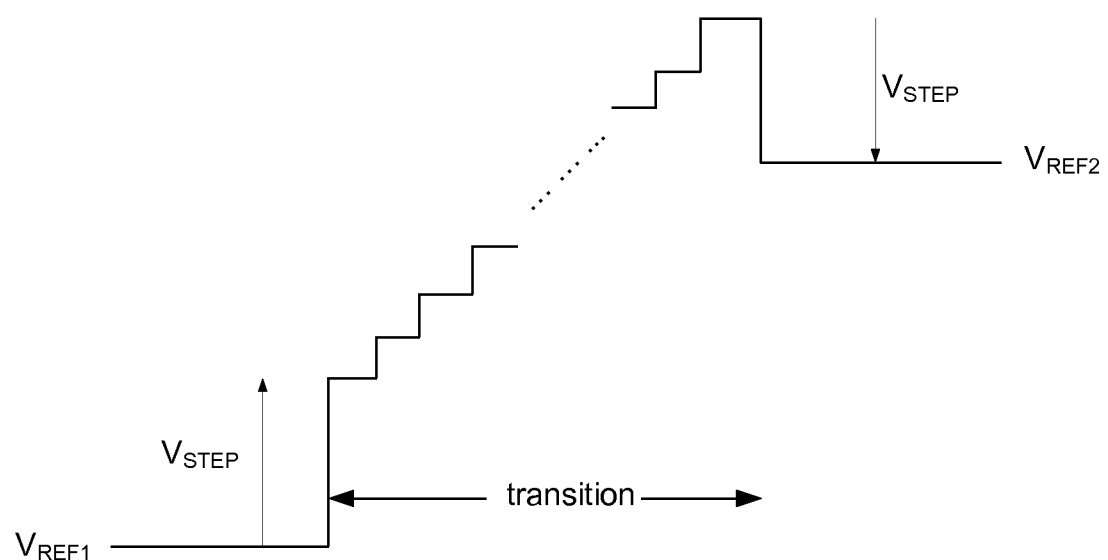
FIG. 3 illustrates an exemplary diagram of a reference voltage $V_{REF}$ according to various embodiments in the invention.

FIG. 3 illustrates an exemplary diagram 300 of a reference voltage $V_{REF}$ according to various embodiments in the invention. The reference voltage $V_{REF}$ transitions from a first reference value $V_{REF1}$ to a second reference value $V_{REF2}$ based on a supplemental voltage step $V_{STEP}$. The reference voltage $V_{REF}$ is first raised by the supplemental voltage step $V_{STEP}$, and further increases to the voltage $V_{REF2}+V_{STEP}$ by a series of incremental steps $v_0$. The series of incremental steps are completed within a transition time $T_{ALERT}$, and substantially associated with a slew rate SR that is required for the corresponding supply voltage transition. At the end of this transition, the reference voltage $V_{REF}$ drops by the supplemental voltage step $V_{STEP}$ and settles at the second reference voltage $V_{REF2}$.

In accordance with the invention, the supplemental voltage step $V_{STEP}$ may be incorporated in the reference voltage $V_{REF}$ 300 in various components of the voltage converter 102. In a first embodiment, the supplemental voltage step $V_{STEP}$ is introduced in a reference regulator under the control of the step control, and the reference regulator is integrated in the switching regulator 110. In a second embodiment, a similar reference regulator is included in the compensation circuit 112 and operates under the control of the step control. The supplemental voltage step $V_{STEP}$ is integrated within the reference voltage $V_{REF0}$ in addition to alternative compensations. In a third embodiment, the supplemental voltage step $V_{STEP}$ is superimposed onto the reference voltage $V_{REF}$ in the internal DAC 108. In a fourth embodiment, the supplemental voltage step $V_{STEP}$ is enabled via a programmable current source coupled to the local ground GNDS of the load 106 through a resistor, and this current source is independent from or integrated within one of the other components.

Figure 4A:
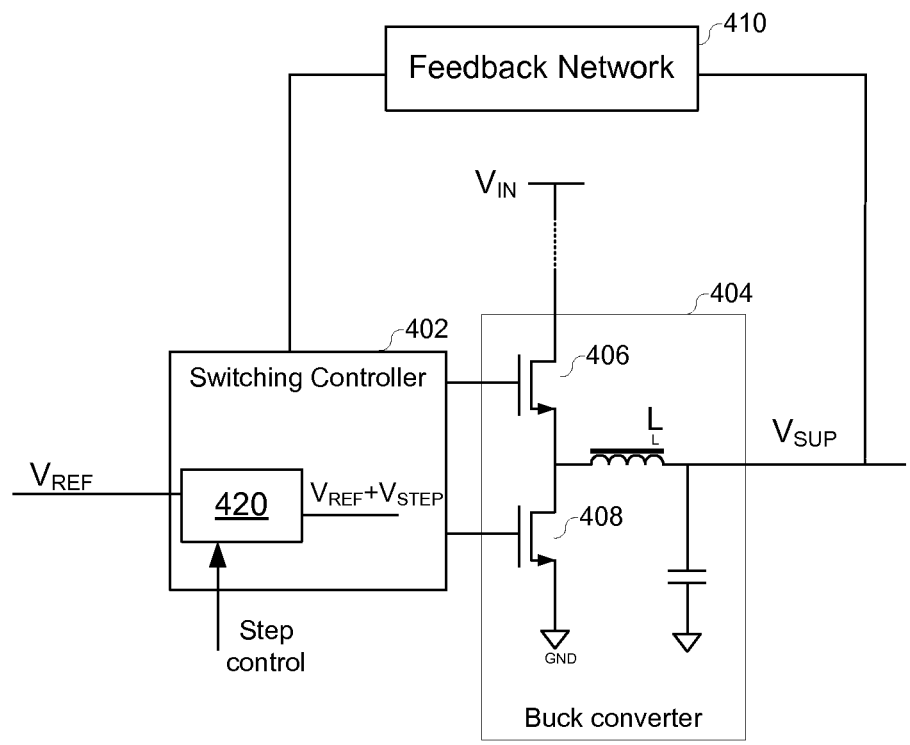
FIG. 4A illustrates an exemplary block diagram of a switching regulator according to various embodiments in the invention.

FIG. 4A illustrates an exemplary block diagram of a switching regulator 110 according to various embodiments in the invention. The switching regulator 110 comprises a switching controller 402, a buck converter 404 and a feedback network 410. The switching controller 402 uses the reference voltage $V_{REF}$ as a reference, and generates at least one converter control. The buck converter 404 is controlled by the converter control to alternate between two control states. An inductor in the converter 404 temporarily store power in one control state and release it in a subsequent control state, and therefore, the output supply voltage $V_{SUP}$ is continuously maintained by the power that is either directly provided by an input supply voltage $V_{IN}$ or previously stored in the inductor. The converter control determines the duty cycles of these two control states according to difference between the reference voltage $V_{REF}$ and the output supply voltage VSUP.

In this embodiment, the buck converter 404 adopts a synchronous topology and comprises an inductor L, a low-side NMOS switch 408 and a high-side switch 406. The high-side switch 406 may be a PMOS or NMOS transistor. The high-side and low-side switches 408 are turned on during two consecutive control states, respectively, such that the supply voltage $V_{SUP}$ is controlled substantially at a stable voltage that is equal to reference voltage $V_{REF}$. During a first control state, the input voltage $V_{IN}$ is coupled to drive the load 106 via a path that comprises the high-side switch 406 and the inductor L. In addition, energy is stored in the inductor L during this first control state. During a subsequent second control state, the high-side switch 406 is turned off, and the low-side switch 408 is turned on. The load 106 is decoupled from the input voltage $V_{IN}$, and the energy within the inductor L is released to drive the load 106.

A high-side converter control and a low-side converter control are respectively used to control the high-side and low-side switches 406 and 408 in the buck converter 404. These two converter controls are enabled alternatively, and may adopt distinct duty cycles. In particular, a tri-state time $t_0$ is preferably maintained between two consecutive active durations of the high-side and low-side converter controls.

For a particular reference voltage $V_{REF}$, the switching controller 402 determines the high-side and low-side converter controls by comparing the supply voltage $V_{SUP}$ at the output of the buck converter 404 with the reference voltage $V_{REF}$. When the supply voltage $V_{SUP}$ is sensed to be lower than the voltage $V_{REF}$, a first control state is enabled by turning on the high-side switch 406 and turning off the low-side switch 408. The supply voltage $V_{SUP}$ increases toward the voltage $V_{REF}$. Once the supply voltage $V_{SUP}$ increases beyond the voltage $V_{REF}$, the second control state is subsequently enabled by turning off the high-side switch 406 and turning on the low-side switch 408, respectively. The supply voltage $V_{SUP}$ decreases toward the voltage $V_{REF}$. As a result, the supply voltage $V_{SUP}$ is controlled to be substantially equal to the reference voltage $V_{REF}$.

One of those skilled in the art knows that the buck converter 404 may also adopt other topologies, such as certain nonsynchronous topologies. The converter controls generated by the switching regulator are also adjusted according to the particular converter topology. In some embodiments, the control switch 406 is optional, and may not be required for related DC-DC voltage conversion.

In one embodiment, the switching controller 402 further comprises a reference regulator 420. Upon receiving a step control, the reference regulator directly adjusts the reference voltage $V_{REF}$ by the supplemental voltage step $V_{STEP}$, and the converter controls are subsequently varied according to the adjusted reference voltage $V_{REF}$. To be more specific, the duty cycles of the high-side and low-side converter controls are varied to expedite the transition of the output supply voltage $V_{SUP}$.

The feedback network 410 is used to close the loop of the regulator and to allow proper regulation of the supply voltage $V_{SUP}$. In various embodiments of the invention, the feedback network 410 is coupled to receive the output supply voltage $V_{SUP}$. The voltage $V_{SUP}$ is appropriately scaled, and applied at the input of the switching regulator 110, compensating against all the possible variations.

Figure 4B:
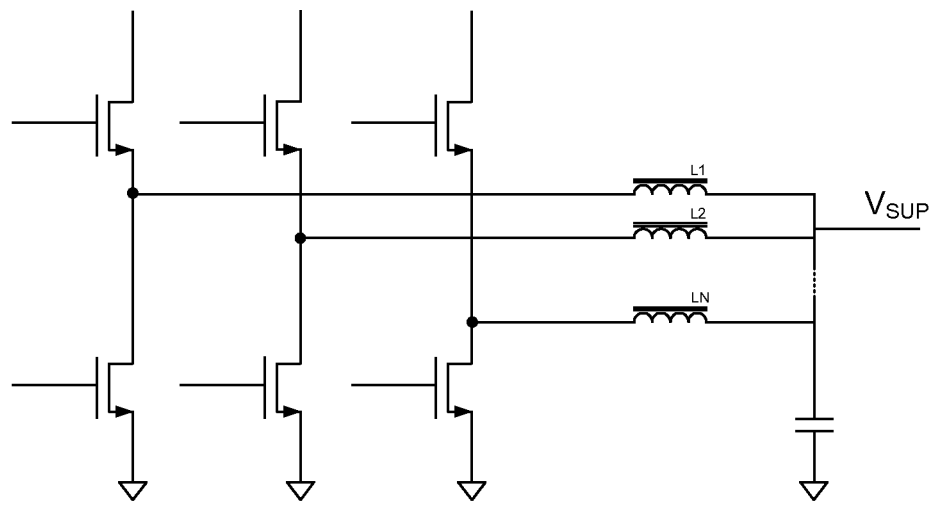
FIG. 4B illustrates an exemplary block diagram of a multi-phase buck converter according to various embodiments in the invention.

FIG. 4B illustrates an exemplary block diagram of a multi-phase buck converter 404 according to various embodiments in the invention. The multi-phase buck converter 404 is driven by a multi-phase switching controller 402. The multi-phase buck converter 404 includes a plurality of parallel inductors ($L_1$, $L_2$, . . . , $L_N$) that are coupled between the switches and the output supply voltage $V_{SUP}$, and each of the plurality of parallel inductors is controlled by a respective set of high-side and low-side switches 406 and 408.

In each phase, the parallel inductors are selectively coupled to drive the load 106 according to the corresponding load condition. Larger current capability is normally associated with the multiphase buck converter 404, since it has the ability to share and balance the total current required from the parallel inductors for driving the load. Converter controls are enabled to select the inductor or subset of inductors according to the corresponding load condition, and the duty cycles of the enabled converter controls may be regulated differently based on the load condition. In one embodiment, when the step control is used to adjust the reference voltage $V_{REF}$ in the switching regulator 112, the supplemental voltage step $V_{STEP}$ may vary according to the bandwidth that is associated with the number of inductors used by the switching regulator.

Figure 5A:
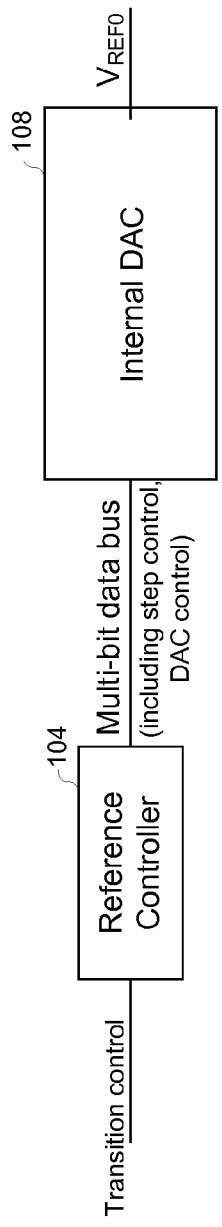
FIG. 5A illustrates an exemplary block diagram of an internal DAC that provides a reference voltage $V_{REF0}$ according to various embodiments in the invention.

FIG. 5A illustrates an exemplary block diagram 108 of an internal DAC that provides a reference voltage $V_{REF0}$ according to various embodiments in the invention. The internal DAC 108 receives a multi-bit data bus from the reference controller 104, and the corresponding multi-bit data includes both the step control and the reference control except that the step control may not be actively used in this embodiment. During the entire supply voltage transition, the reference controller 104 calculate the multi-bit data associated with the reference voltage $V_{REF0}$ at each variation step, and updates the data to the internal DAC 108 via the multi-bit data bus. The digital data associated with the supplemental voltage step $V_{STEP}$ is automatically superimposed within the multi-bit data by the reference controller 104. Under the control of this multi-bit data bus, the internal DAC 108 generates the reference voltage $V_{REF0}$ that includes the supplemental voltage step $V_{STEP}$, and the reference voltage $V_{REF0}$ gradually varies by a series of fine steps $v_0$ during the transition. At the end of the transition, the reference controller 104 deducts from the multi-bus data the digital data associated with the supplemental voltage step $V_{STEP}$, and thereby, the reference voltage $V_{REF0}$ generated by the internal DAC 108 settles at $V_{REF2}$.

Figure 5B:
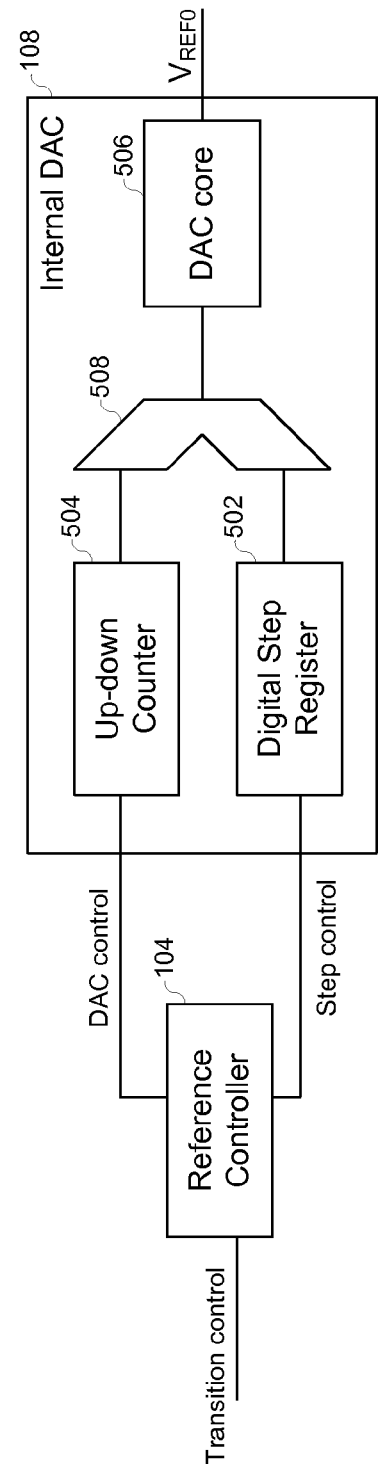
FIG. 5B illustrates another exemplary block diagram of an internal DAC that provides a reference voltage $V_{REF0}$ according to various embodiments in the invention.

FIG. 5B illustrates another exemplary block diagram 108 of an internal DAC that provides a reference voltage $V_{REF0}$ according to various embodiments in the invention. The internal DAC 108 comprises a digital step register 502 in addition to the conventional circuit blocks including an up-down counter 504 and a DAC core 506. The up-down counter 504 enables the reference voltage $V_{REF0}$ outputted by the DAC core 506 to vary gradually by a series of fine steps $v_0$, while the digital step register 502 enable the reference voltage $V_{REF}$ to vary by a supplemental voltage step $V_{STEP}$.

The internal DAC 108 is coupled to receive both the DAC control and the step control from the reference controller 104. The DAC control is applied to control the up-down counter 504 for gradually varying the reference voltage $V_{REF}$, and the step control is particularly used to control the digital step register 502 to enable the step variation of the reference voltage $V_{REF0}$. Combination logic 508 digitally combines the outputs of the up-down counter 504 and the digital step register 502. In one embodiment, the combination logic 508 is a digital adder. According to FIG. 2C, the digital step register 502 first provides a digital step data that enables and sustains the supplemental voltage step $V_{STEP}$ during the transition. The up-down counter 504 incrementally counts to enable the series of incremental steps in addition to the supplemental voltage step $V_{STEP}$. At the end of the transition, the digital step register 502 is reset to zero, while the up-down counter 504 maintains its last counting data. As a result, the DAC core 506 generates the corresponding analog voltage, i.e., the reference voltage $V_{REF0}$, according to the digital data provided by the combination logic 508.

Figure 6:
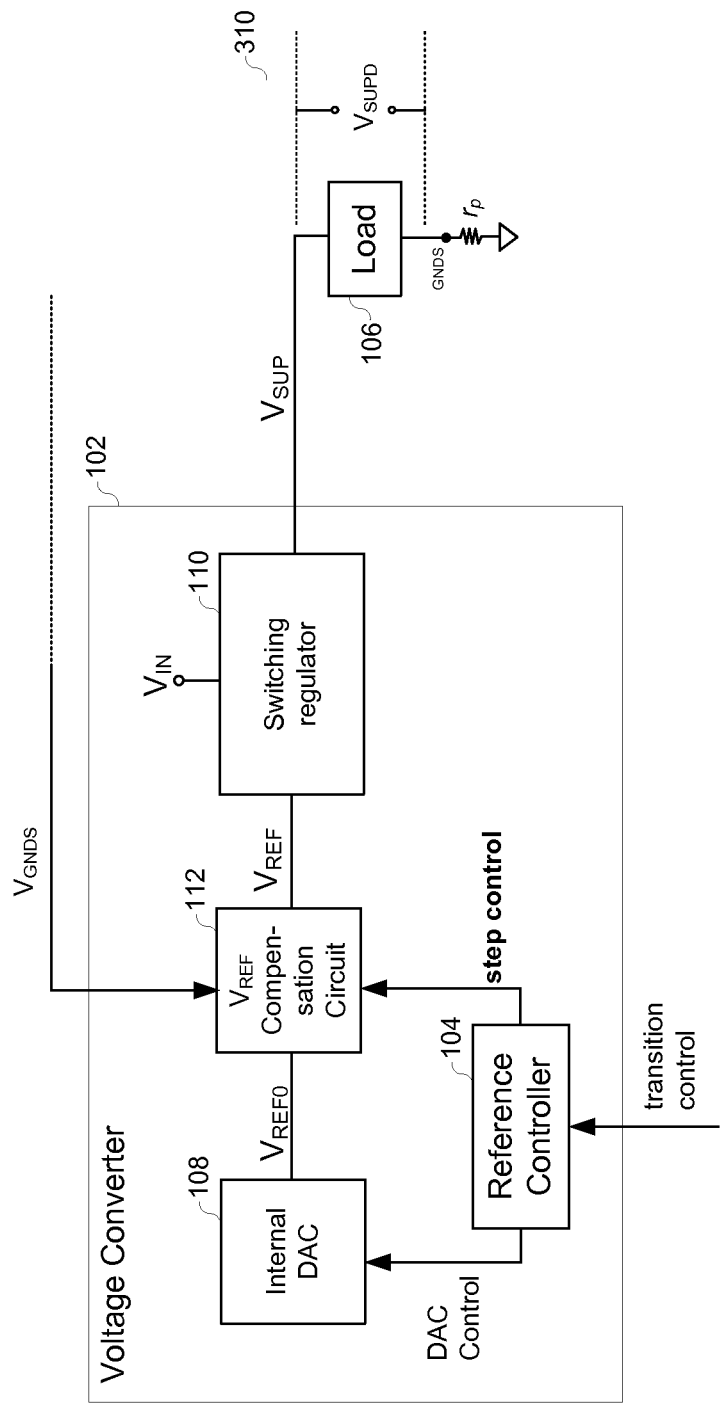
FIG. 6 illustrates an exemplary block diagram of a voltage converter that drives a load according to various embodiments in the invention.

FIG. 6 illustrates an exemplary block diagram 600 of a voltage converter that drives a load according to various embodiments in the invention. The $V_{REF}$ compensation circuit 112 is used to compensate various parasitics including a voltage drop $V_{GNDS}$ related to the local ground of the load 106. The voltage drop $V_{GNDS}$ occurs particularly because the ground impedance $r_p$ may divide the supply voltage $V_{SUP}$ and reduce the actual supply voltage across the load 106. In accordance with the invention, a reference regulator 420 is incorporated in the compensation circuit 112. The reference regulator 420 is controlled by the step control, and further varies the reference voltage $V_{REF}$ by the supplemental voltage step $V_{STEP}$. As a result, the compensation circuit 112 is not only used for compensating the ground parasitics but also for introducing the supplemental voltage step $V_{STEP}$.

In some embodiments, the parasitic impedance $r_p$ directly causes the ground GNDS at the load 106 to drift, and the compensation circuit 112 compensates such a ground drift based on the local ground voltage $V_{GNDS}$.

Figure 7:
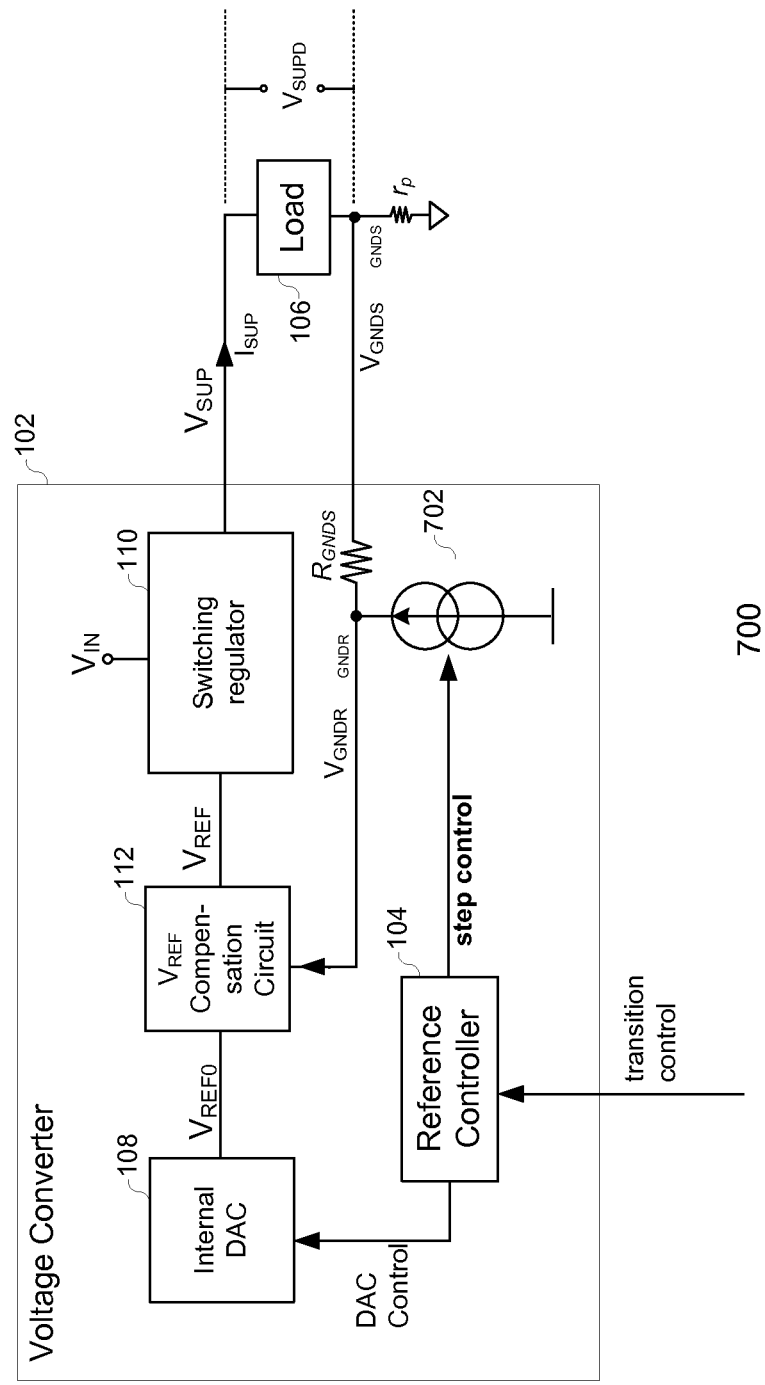
FIG. 7 illustrates an exemplary block diagram of an electronic device that introduces a supplemental voltage step to a reference voltage $V_{REF}$ according to various embodiments in the invention.

FIG. 7 illustrates another exemplary block diagram 700 of an electronic device that introduces a supplemental voltage step $V_{STEP}$ to a reference voltage $V_{REF}$ according to various embodiments in the invention. The load 106 is actually driven by the differential supply voltage $V_{SUPp}$. The supplemental voltage step $V_{STEP}$ is created by enabling the programmable current source 702 during the transitions, the current multiplied by the resistance of the resistor $R_{GNDS}$ sets the voltage amplitude of the voltage step $V_{STEP}$. The compensation circuit 112 senses the ground voltage $V_{GNDR}$ that will be the sum of the local ground $V_{GNDS}$ of the load and the voltage step $V_{STEP}$, and therefore, controls the reference voltage $V_{REF}$ to increase by the supplemental voltage step $V_{STEP}$. The slew rate SR and the settling time $T_{STL}$, are effectively enhanced to meet the requirements pursuant to FIG. 2C.

A programmable current source 702 is included in the electronic device 700, and the magnitude of the current provided by the source 702 is adjusted to generate the supplemental voltage step $V_{STEP}$. The local ground GNDS of the load 106 is coupled to the local ground GNDR of the compensation circuit 112 via a resistor $R_{GNDS}$, and the current source 702 is coupled to the GNDR end of the resistor $R_{GNDS}$. The current source 702 generates a current $I_{REF}$ under the control of the step control. As the current $I_{REF}$ injects into the GNDR end of the resistor $R_{GNDS}$, the local ground voltage $V_{GNDR}$ for the compensation circuit 112 is raised by the supplemental voltage step $V_{STEP}$ with respect to the local ground voltage $V_{GNDS}$ of the load 106. The basic reference voltage $V_{REF0}$ received from the internal DAC 108 is accordingly raised by the supplemental voltage step $V_{STEP}$, and so is the reference voltage $V_{REF}$ outputted to the switching regulator 110. By this means, the compensation circuit 112 not only compensates the variation of the ground voltage $V_{GNDS}$ of the load 106, but also adjusts the reference voltage $V_{REF}$ by the supplemental voltage step $V_{STEP}$ once a transitions occurs.

In some embodiments, that parasitic resistor $r_p$ has resistance in the order of 100-500 μOhm. To generate a supplemental voltage step of 50 mV, a current of 200 A has to be injected into the parasitic resistor $r_p$ in absence of the resistor $R_{GNDS}$, and such a large current is not feasible. Arranged as in FIG. 7, the resistor $R_{GNDS}$ having resistance of the order of Kohm is sufficient to enable the supplemental voltage step of 50 mV under a current of several μAs.

In a preferred embodiment, the programmable current source 702 is integrated within the switching regulator 110, and may particularly be integrated within the switching controller 402 included in the switching regulator 110. In some embodiment, the current source 702 is integrated within the compensation circuit 112. In certain embodiments, the current source 702 is an independent component placed closely to the resistor $R_{GNDS}$.

Figure 8:
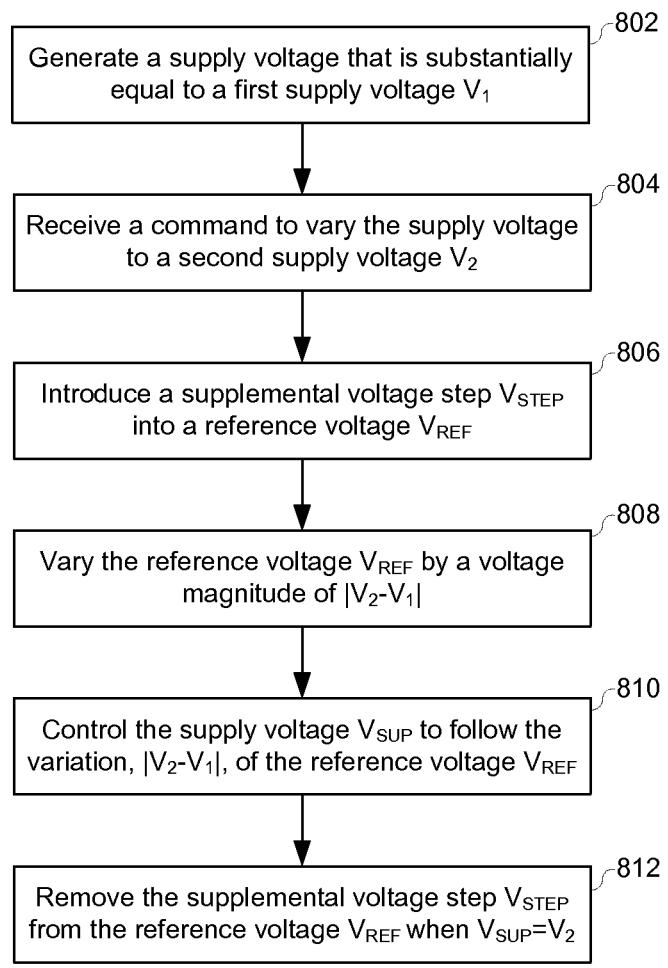
FIG. 8 illustrates an exemplary flow chart for a method of transitioning a supply voltage $V_{SUP}$ from a first supply voltage to a second supply voltage according to various embodiments in the invention.

FIG. 8 illustrates an exemplary flow chart for a method 800 of transitioning a supply voltage $V_{SUP}$ from a first supply voltage to a second supply voltage according to various embodiments in the invention. At step 802, a supply voltage $V_{SUP}$ is generated by a switching regulator to be substantially equal to the first supply voltage $V_1$. This supply voltage $V_{SUP}$ is applied to drive a load. At step 804, a command is received by the switching regulator to vary the supply voltage $V_{SUP}$ to a second supply voltage $V_2$. At step 806, a supplemental voltage step $V_{STEP}$ is introduced to a reference voltage $V_{REF}$. The reference voltage $V_{REF}$ is used by the switching regulator as a reference to generate the supply voltage $V_{SUP}$. At step 808, the reference voltage $V_{REF}$ is varied by a voltage magnitude of $|V_2-V_1|$ based on a slew rate SR that complies with certain requirements. In various embodiments, the reference voltage $V_{REF}$ may increase or decrease by a voltage magnitude of $|V_2-V_1|$, and hence, the supplemental voltage step $V_{STEP}$ is positive if $V_{REF}$ increases, or negative if $V_{REF}$ decreases At step 810, the supply voltage $V_{SUP}$ is controlled to follow the variation of the reference voltage $V_{REF}$ substantially at the slew rate SR. At step 812, the supplemental voltage step $V_{STEP}$ is removed from the reference voltage $V_{REF}$ Step 812 is associated with the end of the transition, and both the supply voltage $V_{SUP}$ and the reference voltage $V_{REF}$ settle at the second supply voltage $V_2$.

In one embodiment, the second supply voltage is higher than the first supply voltage. During the transition, the supplemental voltage step $V_{STEP}$ is introduced to increase the reference voltage $V_{REF}$ by the supplemental voltage step $V_{STEP}$. In another embodiment, the second supply voltage is lower than the first supply voltage. During the transition, the supplemental voltage step $V_{STEP}$ is introduced to further suppress the reference voltage $V_{REF}$ by the supplemental voltage step $V_{STEP}$.

One of those skilled in the art knows that the electronic device in this invention may be a personal computer, a server computer, a cellular phone, a tablet and any device that applies a switching regulator and imposes heightened timing requirements for supply voltage transition.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A voltage converter that drives a load, comprising:
   a reference controller, coupled to receive a transition control associated with a target supply voltage needed to drive the load, the reference controller generating a DAC control signal and a step control signal;
   an internal digital-to-analog converter (DAC), coupled to the reference controller, the internal DAC being controlled by the DAC control signal to generate a reference voltage, the reference voltage being varied from a first voltage to a second voltage within a supply voltage transition, the first and second voltage being associated with the target supply voltage prior to and subsequent to the supply voltage transition, respectively;
   a compensation circuit coupled to the internal DAC, the compensation circuit compensating an offset of the reference voltage for a compensated reference voltage, the offset being caused by a voltage drop associated with a local ground of the load;
   a switching regulator, coupled to the compensation circuit, the switching regulator generating an output supply voltage that tracks the compensated reference voltage at a slew rate; and
   wherein a supplemental voltage step is introduced to the compensated reference voltage under the step control signal during the supply voltage transition and deducted from the compensated reference voltage once the load is driven by the target supply voltage.

2. The voltage converter according to claim 1, wherein the local ground of the load being coupled to a ground of the compensation circuit as a feedback signal via a resistor, the voltage converter further incorporating a programmable current source that is coupled directly to the ground of the compensation circuit, the supplemental voltage step being introduced to the reference voltage based on the magnitude of the programmable current source that is determined by the step control signal and the resistance of the resistor.

3. The voltage converter according to claim 1, wherein the compensation circuit receives the step control signal and compensates the reference voltage by the supplemental voltage step.

4. The voltage converter according to claim 1, wherein the load is a central processing unit (CPU) in a personal computer, and the voltage converter is integrated in a processor power module to provide the target supply voltage that is generated under the control of a digital machine in the CPU.

5. The voltage converter according to claim 1, wherein the magnitude of the supplemental voltage step is determined by the slew rate and a time constant that is associated with a plurality of parasitic sources in the voltage converter and the load.

6. The voltage converter according to claim 1, wherein the slew rate of the voltage converter is associated with a finite number of predetermined slew rates, and so is the supplemental voltage step.

7. The voltage converter according to claim 1, wherein in addition to the supplemental voltage step, the reference voltage increases from the first voltage to the second voltage by a series of incremental steps.

8. The voltage converter according to claim 1, wherein the switching regulator further comprises:
   a switching controller, coupled to receive the reference voltage, the switching controller generating at least one converter control based on the reference voltage; and
   a buck converter, coupled to the switching controller, the buck converter alternating between two control states and generating the output supply voltage, wherein an inductor in the buck converter temporarily stores power in one control sate and releases the stored power in the other state, such that the output supply voltage is maintained to drive the load at the target supply voltage.

9. The voltage converter according to claim 8, wherein the switching controller further comprises a reference regulator that receives the step control signal and adjusts the reference voltage by the supplemental voltage step before the reference voltage is used to generate the at least one converter control.

10. The voltage converter according to claim 1, wherein the internal DAC receives the step control signal and adjusts the reference voltage by the supplemental voltage step.

11. A method of varying a supply voltage that drives a load to a target supply voltage, comprising the steps of:
   generating the supply voltage that is equal to a first voltage;
   receiving a command to vary the supply voltage to a second voltage, the first and second voltage being associated with the target supply voltage set forth to drive the load prior to and subsequent to a supply voltage transition;
   generating a reference voltage, the reference voltage being varied from the first voltage to the second voltage within a supply voltage transition;
   compensating an offset of the reference voltage for a compensated reference voltage, the offset being caused by a voltage drop associated with a local ground of the load;
   introducing a supplemental voltage step into to the compensated reference voltage that is used as a reference to generate the supply voltage;
   varying the compensated reference voltage by a voltage magnitude that is equal to the difference between the first and second voltages;

controlling the supply voltage to follow the corresponding variation of the compensated reference voltage at a slew rate; and deducting the supplemental voltage step from the compensated reference voltage when the supply voltage reaches the second voltage, both the compensated reference voltage and the supply voltage settling at the second voltage.

12. The method according to claim 11, wherein the second voltage is higher than the first voltage, and the supplemental voltage step is introduced to increase the reference voltage.

13. The method according to claim 11, wherein the second voltage is lower than the first voltage, and the supplemental voltage step is introduced to suppress the reference voltage.

14. The method according to claim 11, wherein the magnitude of the supplemental voltage step is determined by the slew rate and a time constant that is associated with a plurality of parasitic sources.

15. The method according to claim 11, wherein the slew rate of the voltage converter is associated with a finite number of predetermined slew rates, and so is the supplemental voltage step.

16. The method according to claim 11, wherein a switching regulator that comprises a switching controller and a buck converter is applied to control the supply voltage to follow the variation of the reference voltage, and wherein the switching controller further comprises a reference regulator that adjusts the reference voltage by the supplemental voltage step.

17. A voltage converter that drives a load with compensation, comprising:
   a reference controller that receives a transition control associated with a target supply voltage needed to drive the load and generates a DAC control signal and a step control signal;
   an internal digital-to-analog converter (DAC), coupled to the reference controller, the internal DAC being controlled by the DAC control signal to generate a reference voltage, the reference voltage being varied from a first voltage to a second voltage within a supply voltage transition, the first and second voltage being associated with the target supply voltage prior to and subsequent to the supply voltage transition, respectively;
   a compensation circuit, coupled between the internal DAC and a switching regulator, the compensation circuit compensating an offset of the reference voltage for a compensated reference voltage, wherein the offset is caused by a voltage drop associated with a local ground of the load;
   the switching regulator, coupled to the internal DAC, the switching regulator generating an output supply voltage that tracks the compensated reference voltage at a slew rate; and
   wherein a supplemental voltage step is introduced to the compensated reference voltage under the step control signal during the supply voltage transition and deducted from the compensated reference voltage when the load is driven by the target supply voltage.

18. The voltage converter according to claim 17, wherein the local ground of the load being coupled to a ground of the compensation circuit as a feedback signal via a resistor, the voltage converter further incorporating a programmable current source that is coupled directly to the ground of the compensation circuit, the supplemental voltage step being introduced to the reference voltage based on the magnitude of the programmable current source that is determined by the step control and the resistance of the resistor.

19. The voltage converter according to claim 17, wherein the compensation circuit receives the step control signal and compensates the compensated reference voltage by the supplemental voltage step.

\* \* \* \* \*